(12) United States Patent
Leggette et al.

(10) Patent No.: US 9,483,656 B2
(45) Date of Patent: Nov. 1, 2016

(54) EFFICIENT AND SECURE DATA STORAGE UTILIZING A DISPERSED DATA STORAGE SYSTEM

(75) Inventors: Wesley Leggette, Oak Park, IL (US); Jason Resch, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 373 days.

(21) Appl. No.: 12/426,727

(22) Filed: Apr. 20, 2009

(65) Prior Publication Data
US 2010/0268966 A1 Oct. 21, 2010

(51) Int. Cl.
| | | |
|---|---|---|
| *H04L 9/28* | (2006.01) | |
| *G06F 17/30* | (2006.01) | |
| *G06F 21/62* | (2013.01) | |
| *G06F 3/06* | (2006.01) | |
| *G06F 11/10* | (2006.01) | |
| *H04L 9/08* | (2006.01) | |
| *H04L 9/06* | (2006.01) | |
| *H04K 1/00* | (2006.01) | |

(52) U.S. Cl.
CPC .......... *G06F 21/6227* (2013.01); *G06F 3/067* (2013.01); *G06F 11/1076* (2013.01); *G06F 21/6218* (2013.01); *H04L 9/0618* (2013.01); *H04L 9/085* (2013.01)

(58) Field of Classification Search
CPC .................. G06F 11/1076; G06F 2211/1028; G06F 11/2094; G06F 21/6218; G06F 21/6227; G06F 3/0689; G06F 11/08; G06F 11/1004; G06F 2221/2107; G06F 11/1458; G06F 21/62; Y10S 707/99953; Y10S 707/99939; H04L 67/1097; H04L 63/0428; H04L 67/1095; H04L 69/40; H04L 29/06; H04L 63/105; H04L 9/085
USPC ..................................... 380/28, 44; 713/193
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A * | 11/1999 | Garay et al. .................. 713/165 |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |

(Continued)

OTHER PUBLICATIONS

Cohen, Ariel and Walter A. Burkhard. "Segmented Information Dispersal (SID) for Efficient Reconstruction in Fault-Tolerant Video Servers", 1996.*

(Continued)

*Primary Examiner* — Michael Simitoski
(74) *Attorney, Agent, or Firm* — Garlick & Markison; Timothy W. Markison (57) ABSTRACT

A method of securely storing data to a dispersed data storage system is disclosed. A data segment is arranged along the columns or rows of an appropriately sized matrix. Data slices are then created based on either the columns or the rows so that no consecutive data is stored in a data slice. Each data slice is then stored in a separate storage node.

9 Claims, 12 Drawing Sheets

(56) References Cited

U.S. PATENT DOCUMENTS

| | | | |
|---|---|---|---|
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,661,775 B1* | 12/2003 | Nakayama et al. | 370/230.1 |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,907,123 B1* | 6/2005 | Schier | 380/28 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,472,334 B1* | 12/2008 | Scott et al. | 714/785 |
| 7,636,724 B2 | 12/2009 | de la Torre et al. | |
| 7,734,643 B1* | 6/2010 | Waterhouse et al. | 707/770 |
| 2002/0062422 A1 | 5/2002 | Butterworth et al. | |
| 2002/0133707 A1* | 9/2002 | Newcombe | 713/183 |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0182435 A1* | 9/2003 | Redlich et al. | 709/229 |
| 2004/0024963 A1 | 2/2004 | Talagala et al. | |
| 2004/0122917 A1 | 6/2004 | Menon et al. | |
| 2004/0123223 A1* | 6/2004 | Halford | 714/781 |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0039351 A1* | 2/2006 | Furuhashi et al. | 370/351 |
| 2006/0047907 A1 | 3/2006 | Shiga et al. | |
| 2006/0064751 A1* | 3/2006 | Ahuja et al. | 726/14 |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1* | 4/2007 | Gladwin et al. | 711/154 |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0147821 A1* | 6/2008 | Dietrich et al. | 709/216 |
| 2008/0183975 A1* | 7/2008 | Foster et al. | 711/153 |
| 2008/0282049 A1* | 11/2008 | Kawamura et al. | 711/162 |
| 2009/0094251 A1 | 4/2009 | Gladwin et al. | |
| 2009/0094318 A1 | 4/2009 | Gladwin et al. | |
| 2009/0161870 A1* | 6/2009 | Rosenberg | 380/268 |
| 2009/0177894 A1* | 7/2009 | Orsini et al. | 713/193 |
| 2010/0023524 A1 | 1/2010 | Gladwin et al. | |

OTHER PUBLICATIONS

Garay, Juan A. et al. "Secure distributed storage and retrieval", 2000.*

Menezes, Alfred J. et al. Handbook of Applied Cryptography, 1997 John Wiley & Sons, Inc., pp. 17-18.*

Rabin, Michael O. "Efficient Dispersal of Information for Security, Load Balancing, and Fault Tolerance", 1989.*

Lauritsen, Rasmus W. "Backups with Computational Secret Sharing", Apr. 2008.*

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Shamir; How to Share a Secret; Communications of the ACM; vol. 22, No. 11; Nov. 1979; pp. 612-613.

Xin, et al.; Evaluation of Distributed Recovery in Large-Scale Storage Systems; 13th IEEE International Symposium on High Performance Distributed Computing; Jun. 2004; pp. 172-181.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

* cited by examiner

EFFICIENT AND SECURE DATA STORAGE UTILIZING A DISPERSED DATA STORAGE SYSTEM

CROSS-REFERENCE TO RELATED APPLICATIONS

None

FIELD OF THE INVENTION

The present invention relates generally to systems, apparatus, and methods for securely storing data, and more particularly to systems, apparatus, and methods for secure distributed data storage using an information dispersal algorithm so that no one location will store an entire copy of stored data.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple stripes, each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. While modern encryption methods are difficult to break, numerous instances of successful attacks are known, some of which have resulted in valuable data being compromised. Furthermore, if a malicious hacker should gain access to the encryption key associated with the encrypted data, the entirety of the data is recoverable.

While modern encryption tends to utilize block ciphers, such as, for example, 3-way, AES, Anubis, Blowfish, BMGL, CAST, CRYPTON, CS-Cipher, DEAL, DES, DESede, DESX, DFC, DFCv2, Diamond2, E2, FROG, GOST, HPC-1, HPC-2, ICE, IDEA, ISAAC, JEROBOAM, LEVIATHAN, LOKI91, LOKI97, MAGENTA, MARS, MDC, MISTY1, MISTY2, Noekeon, Noekeon Direct, Panama, Rainbow, RC2, RC4, RC4-drop, RC5, Rijndael, SAFER-K, SAFER-SK, SAFER+, SAFER++, SAFER++-64, Sapphire-II, Scream, Scream-F, SEAL-3.0, Serpent, SHARK, SKIPJACK, SNOW, SOBER, SPEED, Square, TEA, Twofish, WAKE-CFB, WiderWake4+1, WiderWake4+3, PBE-PKCS5, PBE-PKCS12, etc., other methods have been used in the past. One early form of encoding is transposition. Transposition involves the deterministic swapping of members within a set. For example, if a five member set X is defined as X={a,b,c,d,e}, a transposition function a may be defined as follows:

$\sigma(0)=a$
$\sigma(1)=e$
$\sigma(2)=c$
$\sigma(3)=d$
$\sigma(4)=b$

Therefore, the application of the transposition function to the entire set X would yield a new set X'={a, e, c, d, b}.

By transposing information transmitted in a message, the usability of the transposed information is reduced or eliminated. However, transposition schemes are easily broken by modern computers.

In 1979, two researchers independently developed a method for splitting data among multiple recipients called "secret sharing." One of the characteristics of secret sharing is that a piece of data may be split among n recipients, but cannot be known unless at least t recipients share their data, where n≥t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s' = s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

A cryptosystem, such as secret sharing, is called information-theoretically secure if its security derives purely from information theory; meaning that its security can be proven even if an adversary has access to unlimited computing power. As a secret sharing scheme can guarantee that no usable information can be recovered unless an attacker gains access to a threshold number of shares, secret sharing is information-theoretically secure. However, each data share is of equal size as the original data, so secret sharing makes for an inefficient storage mechanism.

All-or-nothing encryption is a recent development in cryptography, with the property that the entire cyphertext must be known before even a portion of the original data can be recovered. The original motivation behind all-or-nothing encryption was to increase the time required by brute force attacks to successfully compromise an encrypted cyphertext by a factor equal to the number of message blocks within the cyphertext. All-or-nothing encryption is described in "All-Or-Nothing Encryption and the Package Transform," by Ronald L. Rivest, which is hereby incorporated by reference. Additional properties of all-or-nothing encryption are described in "Exposure-Resilient Functions and All-Or-Nothing Transforms," by Ran Canetti, Yevgeniy Dodis, Shai Halevi, Eyal Kushilevitz, and Amit Sahai, as well as "On the Security Properties of OAEP as an All-or-nothing transform," by Victor Boyko, both of which are hereby incorporated by reference.

Dispersed data storage systems involved utilizing an information dispersal algorithm to slice data. Schemes for implementing dispersed data storage systems, such as dispersed data storage networks ("DDSNs"), are also known in the art. For example, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Generally, dispersed data storage systems provide some level of security, as each data slice will contain less information than the original digital information. Furthermore, as each slice is stored on a separate computer, it will generally be harder for a malicious hacker to break into m computers and gather enough data slices to reconstruct the original information. However, depending on the information dispersal algorithm utilized, each data slice will contain up to 1/m part of the original data. Generally, the information will be retained in the data slice as it existed in the original digital information. Accordingly, by compromising a storage node, a malicious hacker could access up to 1/m part of the original data.

OBJECTS OF THE INVENTION

Accordingly, it is an object of this invention to provide a system, apparatus, and method for efficiently implementing a secure dispersed data storage system.

Another object of the invention is to provide a system, apparatus, and method for implementing a secure dispersed data storage system without significantly increasing the amount of stored data.

Another object of the invention is to provide a system, apparatus, and method for implementing a secure dispersed data storage system with a level of security that approaches information theoretic security.

Another object of the invention is to provide a system, apparatus, and method for implementing a secure dispersed data storage system so that an attacker can gain no information about a stored data segment unless the attacker is able to compromise a threshold number (m) data slices.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing a method for securely storing data to a multi-node storage system, the method comprising the steps of arranging a data segment comprised of a plurality of data units in accordance with a matrix having j rows and k columns so that each data unit of the data segment is associated with a position of the matrix. The arranged data segment is then sliced in accordance with either the rows or the columns of the matrix to produce a plurality of data slices so that each data slice does not contain consecutive data units as they were arranged in the original data segment. Each of the data slices is then stored to a separate storage node.

In a further embodiment, a data string is padded with pad data prior to the step of arrangement as described above.

In an alternative embodiment a method for securely storing data using a multi-node storage system is describe, the method starting with the step of encrypting a data segment comprised of a plurality of data units using a suitable block cipher. The encrypted data segment is then arranged in accordance with a matrix having j rows and k columns so that each data unit of the encrypted data segment is associated with a position of the matrix. The encrypted arranged data segment is then sliced in accordance with either the rows or the columns of the matrix to produce a plurality of data slices so that each data slice does not contain consecutive data units as they were arranged in the original data segment. Each of the data slices is then stored to a separate storage node.

In a further embodiment of the disclosed invention, a method for securely storing data using a multi-node storage system comprises the steps of applying an all-or-nothing transformation to a data segment, slicing the all-or-nothing encrypted data segment using an information dispersal algorithm, and storing each of the resultant plurality of data slices on a separate storage node.

In a still further embodiment of the disclosed invention, a method of securely storing data using a multi-node storage system comprises the steps of encrypting a data segment using a first block cipher, applying an all-or-nothing transform to the encrypted data segment, slicing the all-or-nothing encrypted data segment using an information dispersal algorithm, and storing each of the resultant data slices on a separate storage node.

The application of an all or nothing transform can comprise the steps of generating an encryption key using, for example, a random key generator, and encrypting a data segment using the generated encryption key. The digest of the encrypted data is then calculated using an appropriate hashing algorithm, and the encryption key is exclusive-orred with the digest to produce an obfuscated encryption key. The obfuscated encryption key is then packaged with the data segment by, for example, appending the encryption key to the end of the data segment.

The disclosed invention can be operated by different computers. For example, in one embodiment of the disclosed invention, an access computer comprises a network port and a processor. The processor receives a data segment from the network port, arranges the data segment in accordance with a matrix having j rows and k columns, and slices the arranged data segment in accordance with the rows or columns of the matrix. The processor then sends each data slice to a separate storage node. In a separate embodiment, a stand-alone client comprises a network port and a processor. The processor retrieves a data segment and arranges the data segment in accordance with a matrix having j rows and k columns. The processor then slices the arranged data segment in accordance with the rows or columns of the matrix, and sends each data slice to a separate storage node.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
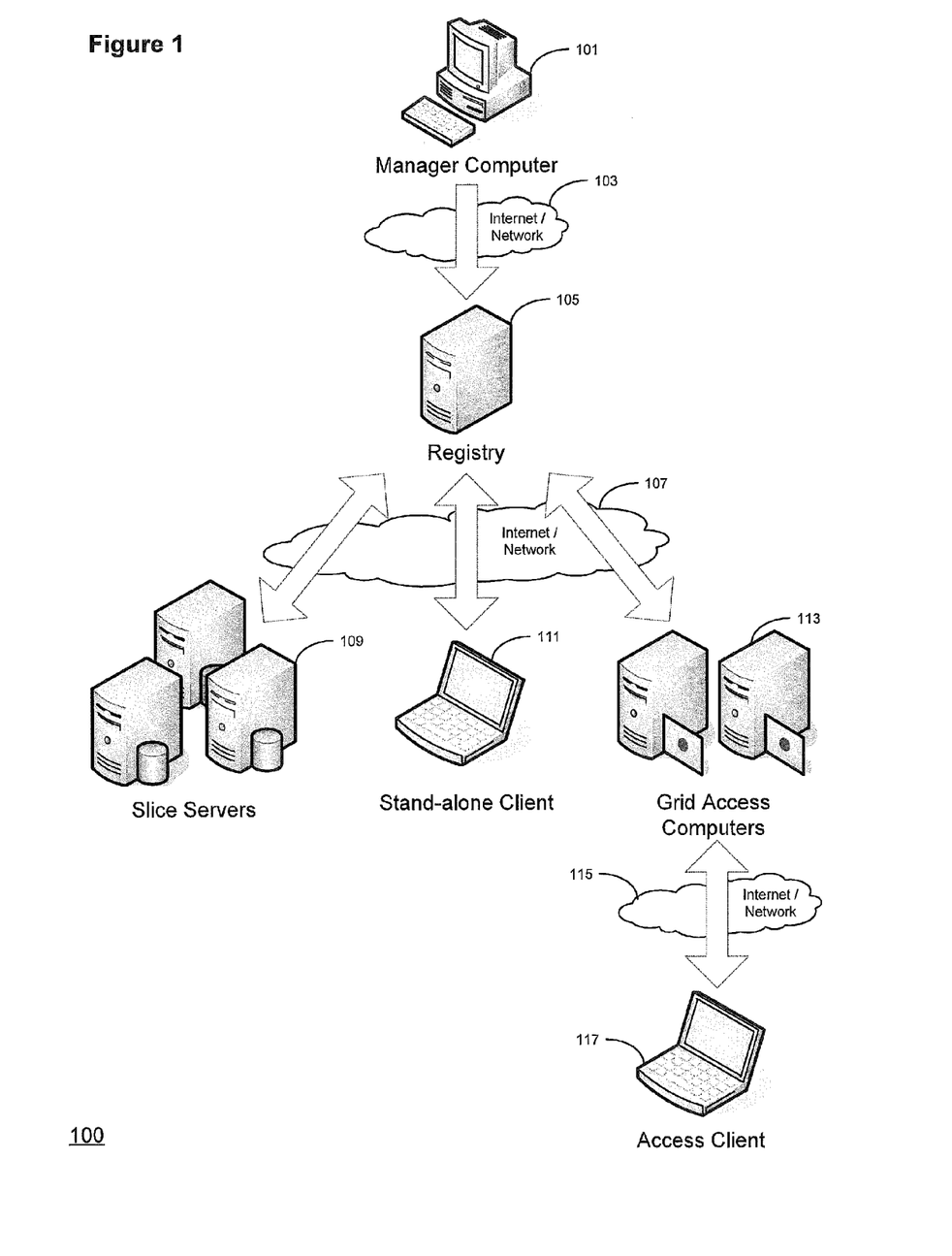
FIG. 1 is a network diagram of a dispersed data storage system utilizing the disclosed security schemes.

Turning to the Figures, and to FIG. 1 in particular, a dispersed data storage system 100 is shown. An arbitrary number of storage nodes, such as slice servers 109 store data slices sent to them by source computers 111, 117. Storage nodes 109 may be networked slice servers as illustrated, or may merely be a collection of drives. In a networked implementation, some number of grid access computers 113 may serve access clients 117 in providing access to the storage nodes 109. Alternatively, the source computers may include the software required to access the storage nodes 109 directly, such as stand-alone client 111. All of the computers may be general purpose computers, comprised of, for example, a housing containing a processor, fast memory, such as dynamic RAM, one or more storage drives, such as rotating media drives or flash drives, a plurality of input/output ports, such as USB ports or Firewire ports, one or more network ports, such as Ethernet ports or 802.11 ports, as well as an external display, and one or more input/output devices, such as a keyboard for data entry, and a mouse or touchpad for cursor control. Alternatively, access computers and storage nodes may be thinner devices. For example, an access computer may be comprised of a housing containing a processor, fast memory, and one or more network ports. Further by way of example, a storage node could be comprised of a housing containing a processor, fast memory, one or more network ports, and one or more storage drives.

Figure 2:
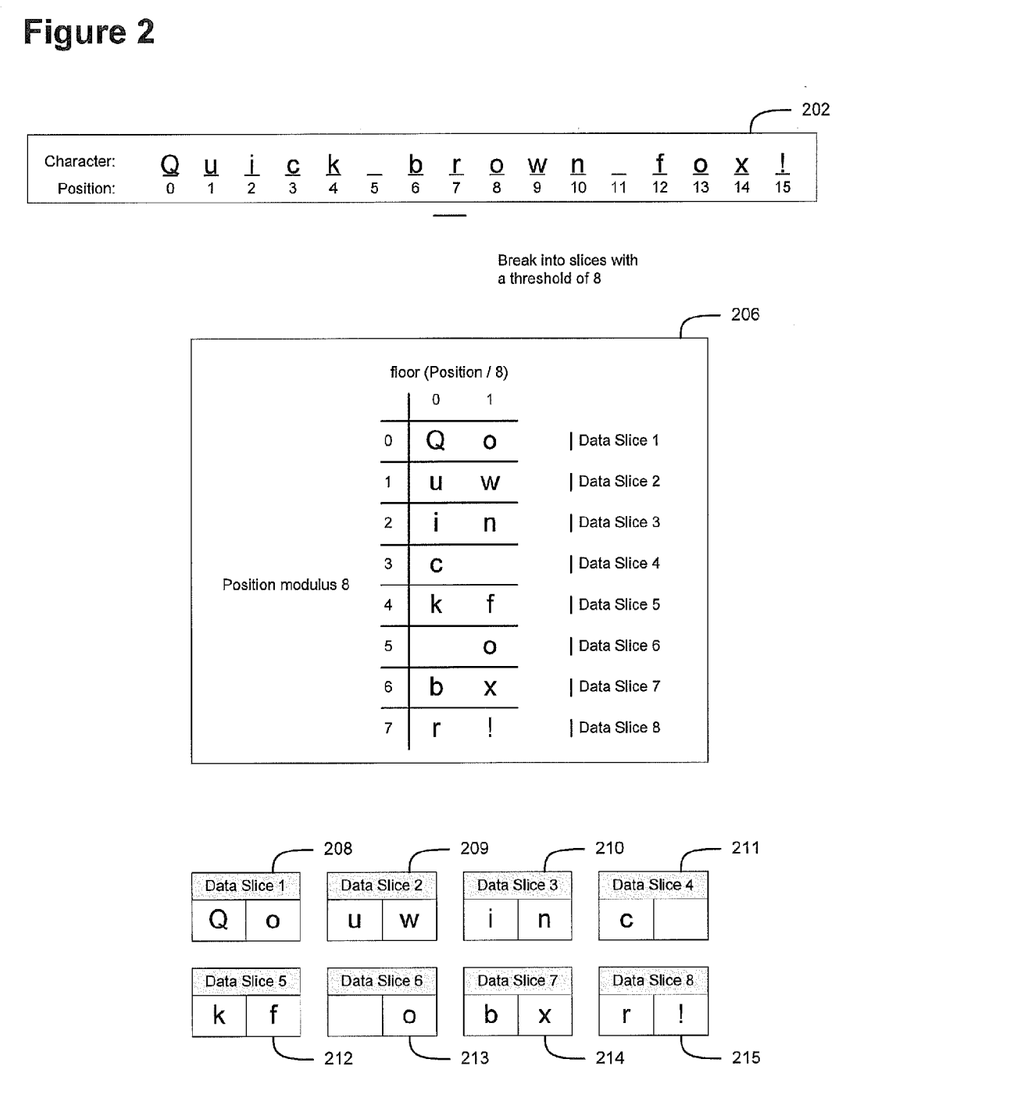
FIG. 2 is an illustration of the principles of transposition as applied to a dispersed data storage system.

FIG. 2 presents an overview of a process to secure a data segment in accordance with an embodiment of the disclosed invention. A data segment 202 is comprised of 16 bytes of ASCII data expressing the phrase "Quick brown fox!" It should be noted that the type of encoding of the data, as well as the size of a data unit, is irrelevant to the invention. Therefore, Unicode instead of ASCII could be used to encode the phrase, and the size of a data unit could be set to word (16 bits), double word (32 bits), or any other size. Furthermore, a data segment could be 32 bytes, 48 bytes, etc.

Where a higher level of security is required, the data segment 202 can be encrypted using an appropriate block cipher, such as DES or AES. While the use of encryption will increase security for the data storage system, it will also increase processor load on computers accessing the storage system. Accordingly, the performance of the system will be lowered, as computers writing data to the dispersed data storage system will need to encrypt data prior to writing it out, and systems reading data will likewise need to decrypt data. For those systems where high performance is more important than high security, the system administrator can elect to disable encryption. In this case, a moderate level of security is still attained by the disclosed system through the use of transposition, as explained below.

Regardless of whether the data segment is encrypted or not, the data within the data segment is arranged in a matrix 206. The matrix 206 is sized so that (1) every element of the data segment is assigned to a particular matrix entry, and (2) the number of data slices created is a multiple of the number of data slices created per data segment. In the depicted example, which assumes that eight data slices are created per data segment, an 8×2 matrix is used to fit the 16 data unit data segment, with the data segment arranged sequentially along the columns.

The data is then dispersed into data slices 208-215, each containing one row of data. As depicted, each data slice 208-215 contains entirely non-consecutive data from the original data segment.

A variety of sizes of matrices can be used to achieve many of the advantages of the disclosed system. For example, for a 16 byte data segment being stored on a system that slices data into 4 data slices, a 4×4 matrix could be used; data could be arranged along either the rows or columns, with the other serving as the basis for the data slices. However, while such an arrangement would increase security for the stored information, as no consecutive data units would be stored in a single slice, the optimal increase in security is achieved by sizing the matrix so that one dimension of the matrix, rows or columns, is equal to the threshold of the dispersed data storage network. For example, in system with a threshold m of eight and the data segment size is set to 16 bytes, an 8×2 matrix could be used as described above. It should be noted that additional, code slices containing redundant data would be generated if the total slice number n for the system is above eight. In this case, if a malicious hacker should recover two consecutive slices, a minimal number of consecutive data units will be recovered, i.e., two strips of data, each two data units in length.

Persons of skill in the art will realize that the decision to arrange data along the columns of the matrix is an arbitrary decision. For example, a 2×8 matrix could be used, and data could be arranged along the rows, instead of the columns. The data slices would then be made from the columns.

Figure 3:
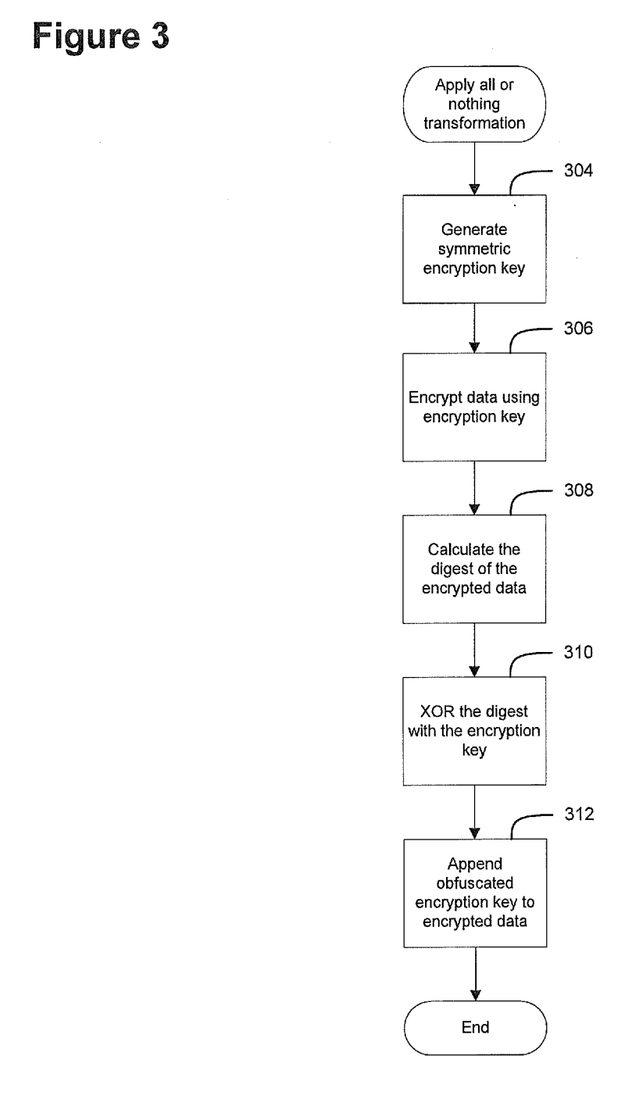
FIG. 3 is a flowchart illustrating the application of an all-or-nothing transformation to a data segment.

FIG. 3 depicts a method for applying an all-or-nothing transformation to a data segment. In a first step 304, a symmetric encryption key is generated. In step 306, the data segment is encrypted using the generated encryption key. In step 308, the digest of the encrypted data is calculated, by applying a hashing algorithm to the data segment; suitable hashing algorithms include MD5, SHA-1, SHA-2, and any other secure cryptographic hashing algorithm. The digest is then XOR-ed with the encryption key in step 310, and the obfuscated encryption key is appended to the data segment in step 312. From this process, it is apparent that the encryption key generated in step 304 is not "secret information," as it will be appended to the data with trivial protection.

Figure 4:
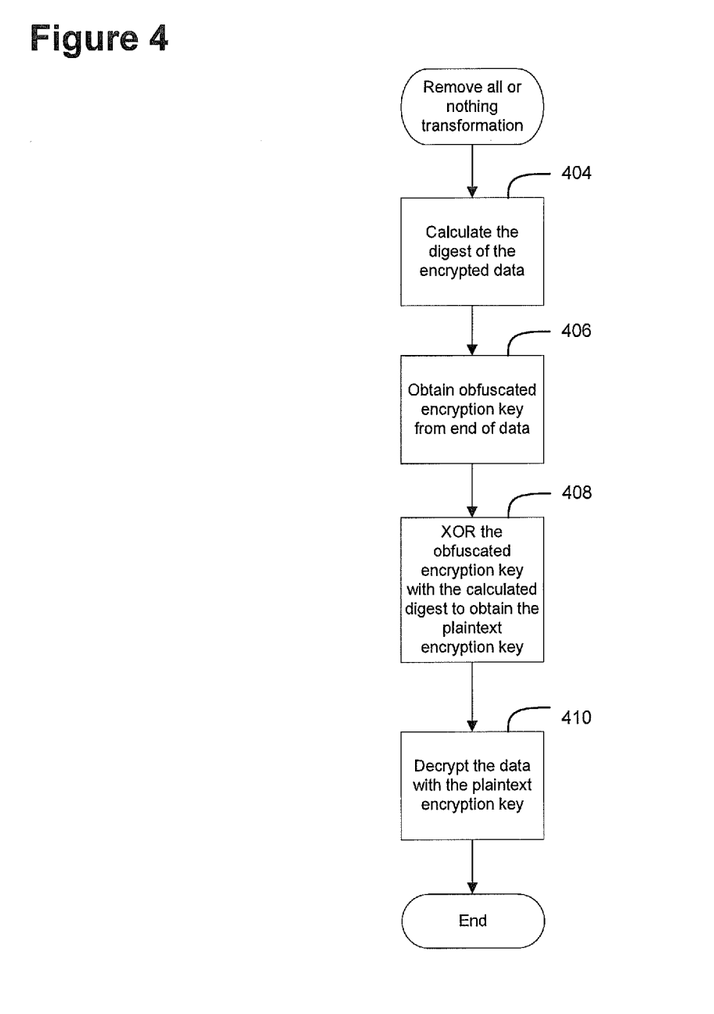
FIG. 4 is a flowchart illustrating the removal of an all-or-nothing transformation from a data segment.

FIG. 4 depicts a method for removing an all-or-nothing transformation from a data segment. In step 404, the digest of the encrypted data is calculated; note that the obfuscated digest placed at the end of the data segment in the method of FIG. 3 is not included in this calculation. It should also be noted that the plaintext encryption key is never stored, but rather, is calculated in memory, and obfuscated before it is appended to the data segment. In step 406, the obfuscated encryption key is read into a memory location, or otherwise obtained, and in step 408, the digest is XOR-ed with the obfuscated encryption key to obtain the plaintext encryption key. Finally, in step 410 data segment is decrypted with the encryption key.

Figure 5:
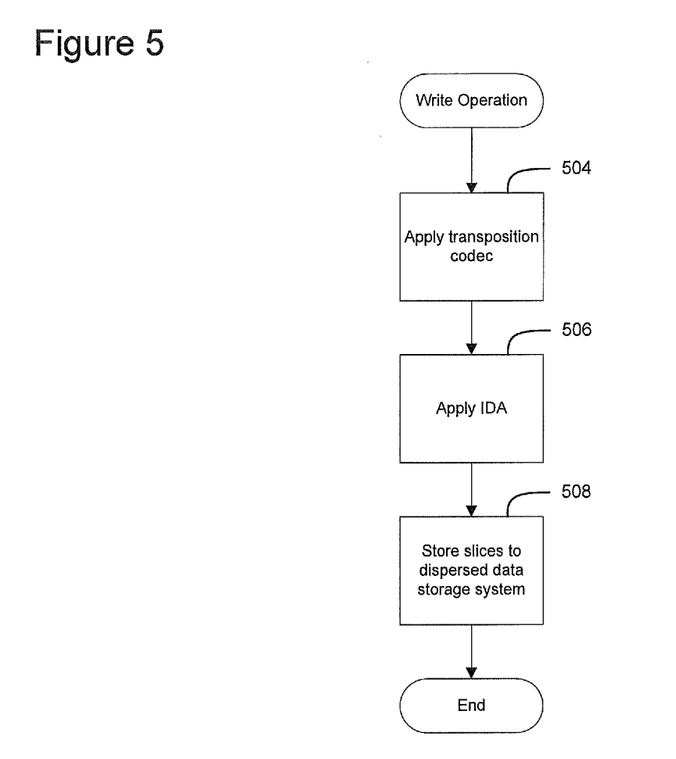
FIG. 5 is a flow chart illustrating a write operation to a dispersed data system utilizing a columnar transposition cipher and an information dispersal algorithm.

FIG. 5 depicts the steps required to write data from an access computer or an integrated client to a dispersed data storage system in accordance with a first embodiment of the disclosed invention. In step 502 a write operation is initiated. The initiation of the write operation involves accepting a data string of arbitrary size, and then, if necessary, padding the string to the dispersed data storage system's data segment size. In step 504 a transposition cipher is applied to the data segment. While the transposition cipher is trivially reversible if a malicious hacker should gain access to a threshold number of slices, the compromise of a single slice will not yield any consecutive information. In step 506 an information dispersal algorithm is applied to the transposed data segment, and the data slices are then written to different storage nodes of the dispersed data storage system in step 508.

Figure 6:
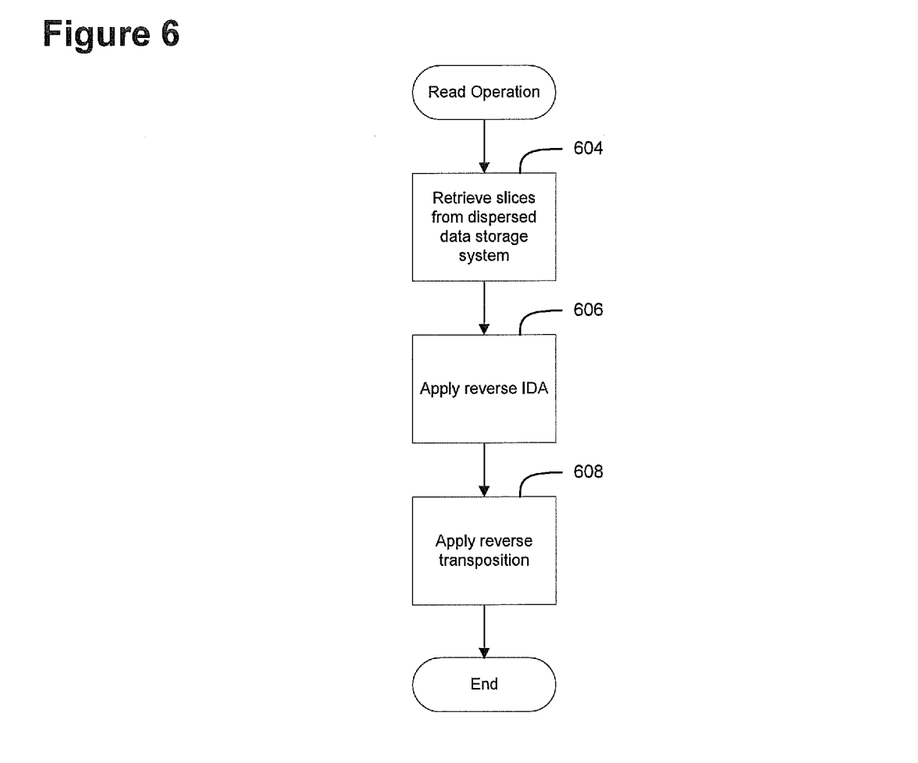
FIG. 6 is a flow chart illustrating a read operation from a dispersed data storage system utilizing a columnar transposition cipher and an information dispersal algorithm.

FIG. 6 depicts the steps required to read data from a dispersed data storage system in accordance with a first embodiment of the disclosed invention. In step 602 a read operation is initiated. In step 604, a threshold number of data slices are retrieved from the dispersed data storage system, where the threshold for a given dispersed data storage system is the minimum number of slices required to reconstruct a stored data segment. In step 406 a reverse information dispersal algorithm is applied to obtain a transposed data segment, and, in step 408 the transposition cipher is reversed to produce a usable data segment.

Figure 7:
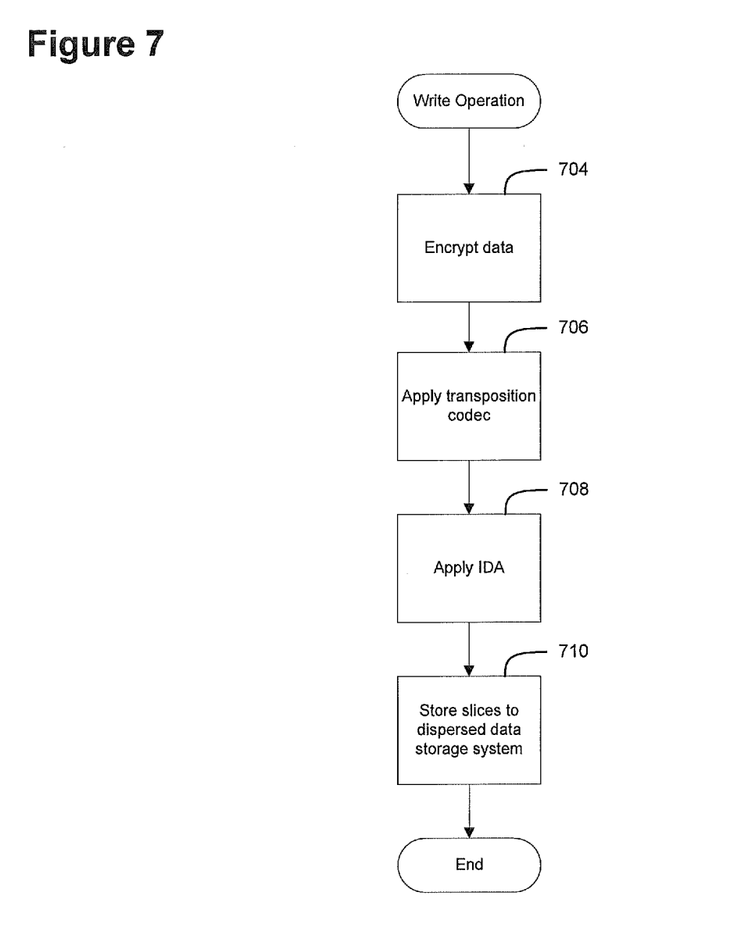
FIG. 7 is a flow chart illustrating a write operation to a dispersed data storage system utilizing encryption, transposition, and an information dispersal algorithm.

FIG. 7 depicts the steps required to write data from an access computer or an integrated client to a dispersed data storage system in accordance with a second embodiment of the disclosed invention. In step 702 a write operation is initiated. The initiation of the write operation involves accepting a data string of arbitrary size, and then, if necessary, padding the string to the dispersed data storage system's data segment size. In step 704, data is encrypted using any suitable block cipher, such as those mentioned earlier in this specification. In step 706 a transposition cipher is applied to the encrypted data segment. The use of the transposition cipher will guarantee that no consecutive data will be stored in any slice, and therefore, even if a malicious hacker should compromise the encryption key, she would still have to assemble a number of slices equal to the dispersed data storage system's threshold prior to gaining access to any usable information.

In step 708 the encrypted and transposed data segment is dispersed using a suitable information dispersal algorithm, such as Cauchy-Reed Solomon. The slices are then stored to different nodes of the dispersed data storage system, such as, for example, slice servers in step 710.

Figure 8:
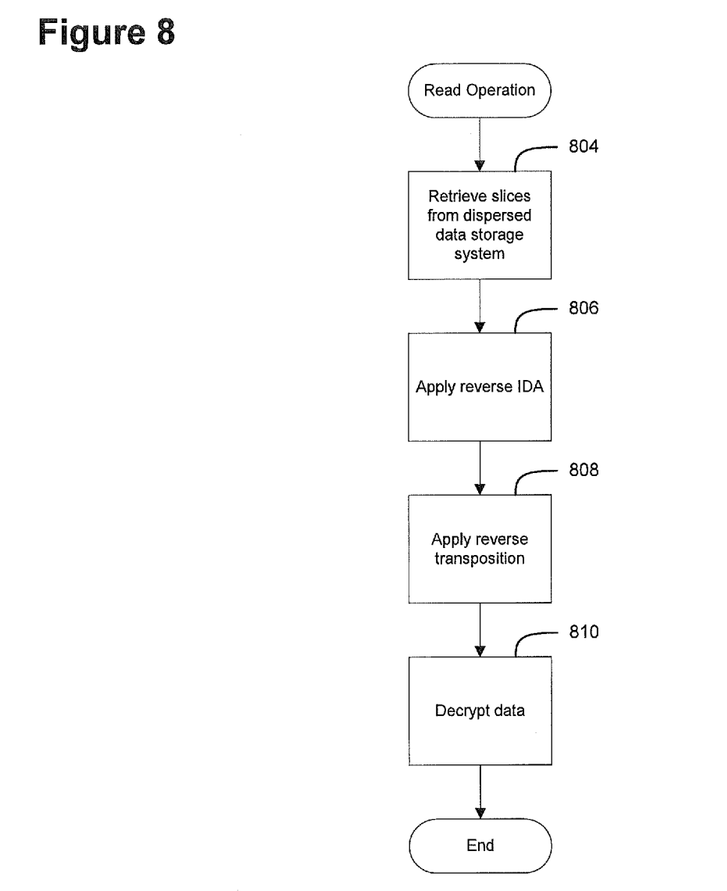
FIG. 8 is a flow chart illustrating a read operation from a dispersed data storage system utilizing encryption, transposition, and an information dispersal algorithm.

FIG. 8 depicts the steps required to read data from a dispersed data storage system in accordance with a second embodiment of the disclosed invention. In step 802 a read operation is initiated. In step 804, a threshold number of data slices are retrieved from the dispersed data storage system, and in step 806 a reverse information dispersal algorithm is applied to obtain a transposed encrypted data segment. In step 808 the transposition cipher is reversed to produce an encrypted data segment, and in step 810 decryption is applied to produce a usable data segment.

The first two embodiments of the disclosed invention involved the use of transposition to improve the security of data stored by a dispersed data storage network. The final two embodiments of the disclosed invention involve the use of all-or-nothing encryption to improve the security of data stored by a dispersed data storage network. Specifically, the use of all-or-nothing encryption, when combined with additional encryption, can provide the advantage of an attacker gaining access to no usable information unless the attacker is able to compromise a threshold m number of data slices. This approaches information theoretic security without the disadvantage of greatly increasing storage size.

Figure 9:
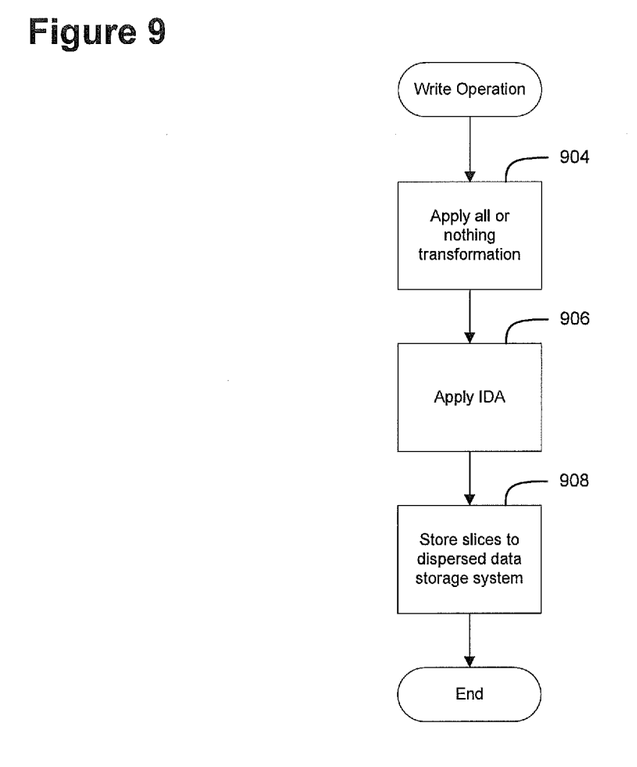
FIG. 9 is a flow chart illustrating a write operation to a dispersed data storage system utilizing an all-or-nothing transformation and an information dispersal algorithm.

FIG. 9 depicts the steps required to write data to a dispersed data storage system in accordance with a third embodiment of the disclosed invention. In step 904, an all-nothing-transformation is applied to a data segment to be stored, thereby producing an all-or-nothing encrypted data segment. The all-or-nothing transformation could be that described earlier in this document, or some other all-or-nothing transformation. In step 906 an information dispersal algorithm is applied to the all-or-nothing encrypted data segment to produce a plurality of data slices, and in step 908, the plurality of data slices is stored to a plurality of storage nodes.

Figure 10:
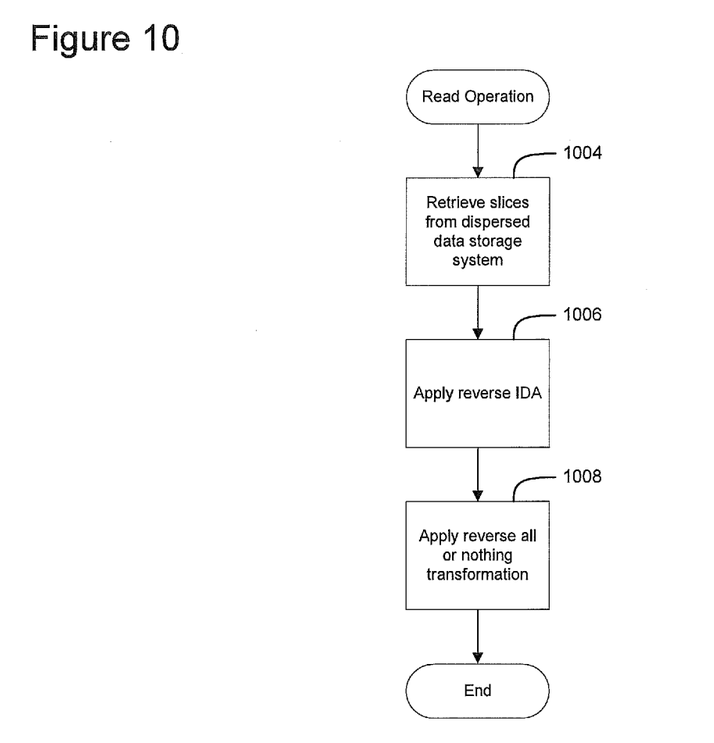
FIG. 10 is a flow chart illustrating a read operation from a dispersed data storage system utilizing an all-or-nothing transformation and an information dispersal algorithm.

FIG. 10 depicts the steps required to read data from a dispersed data storage system in accordance with a third embodiment of the disclosed invention. In step 1004, a plurality of data slices corresponding to a stored data segment are retrieved from a plurality of storage nodes, and a reverse information dispersal algorithm is applied in step 1006. In step 1008, the all-or-nothing transformation is removed by using, for example, the method described earlier in this document, or some other method appropriate to the all-or-nothing transformation to be removed.

Figure 11:
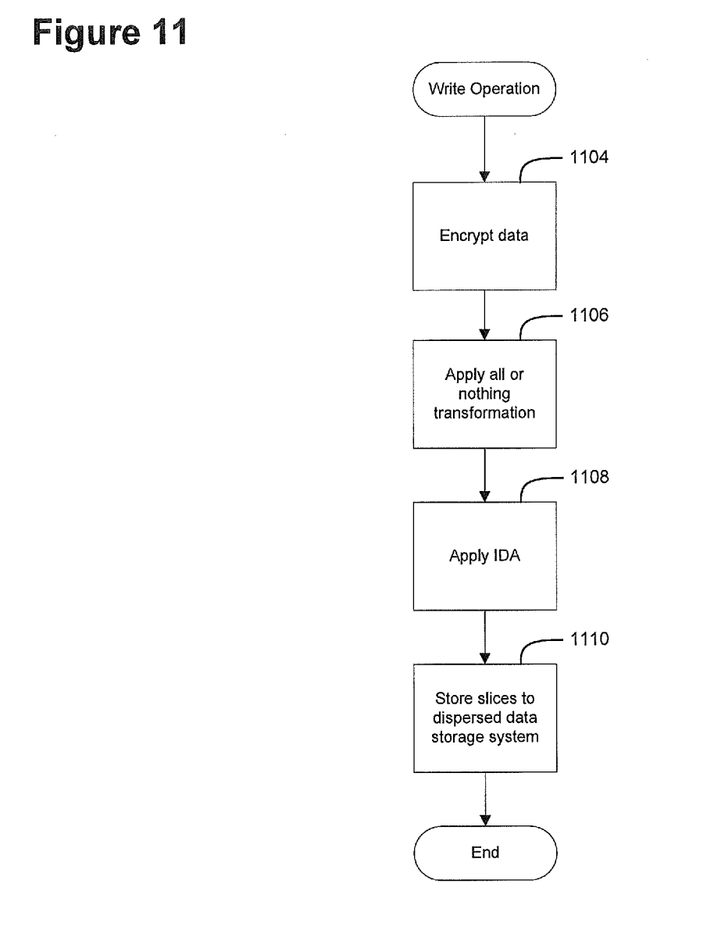
FIG. 11 is a flow chart illustrating a write operation to a dispersed data storage system utilizing encryption, an all-or-nothing transformation, and an information dispersal algorithm.
Figure 12:
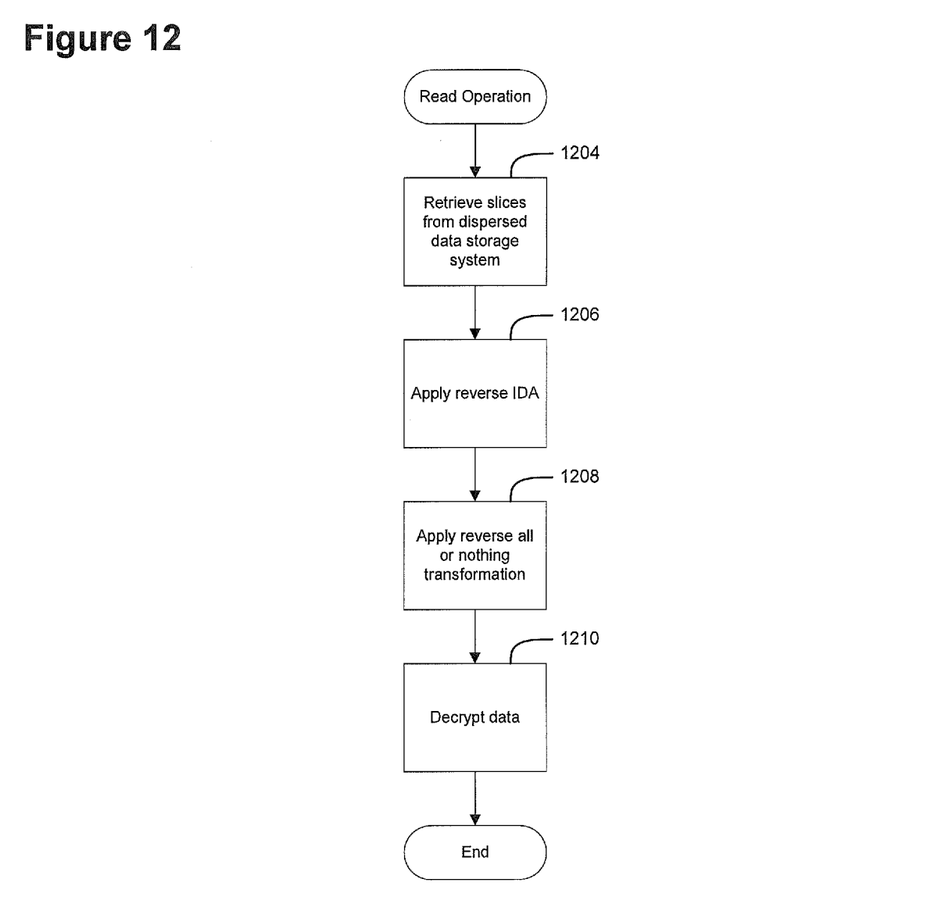
FIG. 12 is a flow chart illustrating a read operation from a dispersed data storage system utilizing encryption, an all-or-nothing transformation, and an information dispersal algorithm.

FIG. 11 depicts the steps required to write data from a dispersed data storage system in accordance with a fourth embodiment of the disclosed invention. In step 1104, a data segment to be stored is encrypted using a block cipher, such as AES, RC4, or any of the block ciphers discussed earlier in this document, thereby producing an encrypted data segment. In step 1106, an all-nothing-transformation is applied to the encrypted data segment to, thereby producing an all-or-nothing encrypted data segment. The all-or-nothing transformation could be that described earlier in this document, or some other all-or-nothing transformation. In step 1108, an information dispersal algorithm is applied to the all-or-nothing encrypted data segment, producing a plurality of data slices, which are stored to a plurality of storage nodes in step 1110. FIG. 12 depicts the steps required to read data from a dispersed data storage system in accordance with a fourth embodiment of the disclosed invention. In step 1204, a plurality of data slices corresponding to a stored data segment are retrieved from a plurality of storage nodes. In step 1206, a reverse information dispersal algorithm is applied, and in step 1208, the all-or-nothing transformation is removed by using, for example, the method described earlier in this document or another appropriate method. Finally, in step 1210, the read data segment is decrypted.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method operating on a computer, the method comprises:
   determining, for data to be stored, a level of security and system performance;
   based on the level of security and system performance:
   determining whether the data is to be encrypted and transposed;
   determining whether the data is to be transposed;
   determining whether the data is to be encoded using an all-or-nothing transformation (AONT); and
   determining whether the data is to be encrypted and encoded using the AONT;
   when the data is to be encrypted and transposed:
   encrypting and transposing the data to produce first secured data; and
   performing an information dispersal algorithm (IDA) on the first secured data to produce a first plurality of sets of IDA encoded data slices;
   when the data is to be transposed:
   transposing the data to produce second secured data; and
   performing the IDA on the second secured data to produce a second plurality of sets of IDA encoded data slices;
   when the data is to be encrypted and encoded using the AONT:
   encrypting and AONT encoding the data to produce third secured data; and
   performing the IDA on the third secured data to produce a third plurality of sets of IDA encoded data slices; and
   when the data is to be encoded using the AONT:
   AONT encoding the data to produce fourth secured data; and
   performing the IDA on the fourth secured data to produce a fourth plurality of sets of IDA encoded data slices; and
   transmitting the first, second, third, or fourth plurality of sets of IDA encoded data slices to storage units of a dispersed storage network for storage therein.

2. The method of claim 1, wherein the all-or-nothing-transformation encoding comprises:
   generating an encryption key;
   encrypting a data segment of the data using the encryption key to produce an encrypted data segment;
   generating an obfuscated encryption key based on the encryption key; and
   appending the obfuscated encryption key to the encrypted data segment to produce an all-or-nothing encrypted data segment of the first secured data.

3. The method of claim 1 further comprises:
   when the data is to be encrypted and transposed:
   generating a first one or more sets of a write threshold number of write requests for the first plurality of sets of IDA encoded data slices;
   when the data is to be transposed:
   generating a second one or more sets of a write threshold number of write requests for the second plurality of sets of IDA encoded data slices; and
   when the data is to be encrypted and encoded using the AONT:
   generating a third one or more sets of a write threshold number of write requests for the third plurality of sets of IDA encoded data slices; and
   when the data is to be encoded using the AONT:
   generating a fourth one or more sets of a write threshold number of write requests for the fourth plurality of sets of IDA encoded data slices.

4. A computer comprising:
   a network port adapted to couple with a network and receive a data segment; and
   a processor coupled to said network port wherein said processor:
   determines, for data to be stored, a level of security and system performance;
   based on the level of security and system performance:
   determines whether the data is to be encrypted and transposed;
   determines whether the data is to be transposed;
   determines whether the data is to be encrypted and encoded using an all-or-nothing transformation (AONT); and
   determines whether the data is to be encoded using the AONT;
   when the data is to be encrypted and transposed:
   encrypt and transpose the data to produce first secured data; and
   perform an information dispersal algorithm (IDA) on the first secured data to produce a first plurality of sets of IDA encoded data slices;
   when the data is to be transposed:
   transpose the data to produce second secured data; and
   perform the IDA on the second secured data to produce a second plurality of sets of IDA encoded data slices;
   when the data is to be encrypted and encoded using the AONT:
   encrypt and AONT encode the data to produce third secured data; and
   perform the IDA on the third secured data to produce a third plurality of sets of IDA encoded data slices; and
   when the data is to be encoded using the AONT:
   AONT encode the data to produce fourth secured data; and
   perform the IDA on the fourth secured data to produce a fourth plurality of sets of IDA encoded data slices; and
   transmit, via the network port, the first, second, third, or fourth plurality of sets of IDA encoded data slices to storage units of a dispersed storage network for storage therein.

5. The computer of claim 4, wherein the processor further functions to all-or-nothing-transformation encode by:
generating an encryption key;
encrypting a data segment of the data using the encryption key to produce an encrypted data segment;
generating an obfuscated encryption key based on the encryption key; and
appending the obfuscated encryption key to the encrypted data segment to produce an all-or-nothing encrypted data segment of the first secured data.

6. The computer of claim 4, wherein the processor further functions to:
when the data is to be encrypted and transposed:
generate a first one or more sets of a write threshold number of write requests for the first plurality of sets of IDA encoded data slices;
when the data is to be transposed:
generate a second one or more sets of a write threshold number of write requests for the second plurality of sets of IDA encoded data slices; and
when the data is to be encrypted and encoded using the AONT:
generate a third one or more sets of a write threshold number of write requests for the third plurality of sets of IDA encoded data slices; and
when the data is to be encoded using the AONT:
generating a fourth one or more sets of a write threshold number of write requests for the fourth plurality of sets of IDA encoded data slices.

7. A computer readable memory comprises:
a first addressable section that stores software, which, when executed by a processor, causes the processor to determine, for data to be stored, a balance of security and system performance;
a second addressable section that stores software, which, when executed by a processor, causes the processor to, based on the balance of security and system performance:
determine whether the data is to be encrypted and transposed;
determine whether the data is to be transposed;
determine whether the data is to be encoded using an all-or-nothing transformation (AONT); and
determine whether the data is to be encrypted and encoded using the AONT;
a third addressable section that stores software, which, when executed by the processor, causes the processor to:
when the data is to be encrypted and transposed:
encrypt and transpose the data to produce first secured data; and
perform an information dispersal algorithm (IDA) on the first secured data to produce a first plurality of sets of IDA encoded data slices;
when the data is to be transposed:
transpose the data to produce second secured data; and
perform the IDA on the second secured data to produce a second plurality of sets of IDA encoded data slices;
when the data is to be encrypted and encoded using the AONT:
encrypt and AONT encode the data to produce third secured data; and
perform the IDA on the third secured data to produce a third plurality of sets of IDA encoded data slices; and
when the data is to be encoded using the AONT:
AONT encode the data to produce fourth secured data; and
perform the IDA on the fourth secured data to produce a fourth plurality of sets of IDA encoded data slices; and
a fourth addressable section that stores software, which, when executed by the processor, causes the processor to:
transmit the first, second, third, or fourth plurality of sets of IDA encoded data slices to storage units of a dispersed storage network for storage therein.

8. The computer readable memory of claim 7, wherein the software of the second addressable section causes the processor to all-or-nothing-transformation encode by:
generating an encryption key;
encrypting a data segment of the data using the encryption key to produce an encrypted data segment;
generating an obfuscated encryption key based on the encryption key; and
appending the obfuscated encryption key to the encrypted data segment to produce an all-or-nothing encrypted data segment of the first secure data.

9. The computer readable memory of claim 7 further comprises:
a fifth addressable section that stores software, which, when executed by the processor, causes the processor to:
when the data is to be encrypted and transposed:
generate a first one or more sets of a write threshold number of write requests for the first plurality of sets of IDA encoded data slices;
when the data is to be transposed:
generate a second one or more sets of a write threshold number of write requests for the second plurality of sets of IDA encoded data slices;
when the data is to be encrypted and encoded using the AONT:
generate a third one or more sets of a write threshold number of write requests for the third plurality of sets of IDA encoded data slices; and
when the data is to be encoded using the AONT:
generating a fourth one or more sets of a write threshold number of write requests for the fourth plurality of sets of IDA encoded data slices.

* * * * *